3,792,061
PROCESS FOR THE PRODUCTION OF
IMIDOCARBOXYLIC ACIDS
Wilfried Zecher, Cologne, and Rudolf Merten, Leverkusen, Germany, assignors to Bayer Aktiengesellschaft, Leverkusen, Germany
No Drawing. Filed Sept. 10, 1970, Ser. No. 71,253
Claims priority, application Germany, Sept. 16, 1969, P 19 46 788.0
Int. Cl. C07d 27/52
U.S. Cl. 260—326 N        10 Claims

ABSTRACT OF THE DISCLOSURE

Process for the production of imidocarboxylic acids by reaction of a cyclic dicarboxylic anhydride and a polyamide at a temperature of from 20 to 450° C. The products obtained are suitable for the production of plasticizers and lacquers.

---

This invention relates to a process for the production of imidocarboxylic acids by reacting polyamides with carboxylic acid anhydrides.

It is already known that imidocarboxylic acids can be obtained by reacting aliphatic or aromatic aminocarboxylic acids with cyclic carboxylic acid anhydrides. One disadvantage of this process is that water is formed during the condensation reaction and has to be removed from the equilibrium. It is furthermore known that lactams also react with carboxylic acid anhydrides to form imidocarboxylic acids.

It is an object of this invention to avoid the abovementioned disadvantage.

This object is accomplished by a process for the production of imidocarboxylic acids in which a polyamide is reacted with a cyclic dicarboxylic acid anhydride or with a compound that forms such an anhydride under the reaction conditions at a temperature of from 20 to 450° C., and preferably at a temperature of from 100 to 250° C., optionally in a solvent and optionally in the presence of a catalyst.

It was extremely surprising that the polyamido carboxylic acids were formed from the polyamides in such a smooth reaction.

For example, imidocarboxylic acids of the general formula:

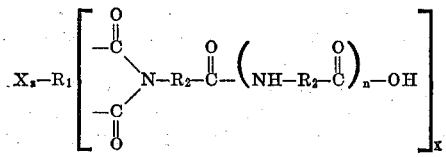

can be obtained by this process from polyamino carboxylic acids of the polycaprolactam type. In the above formula:

$R_1$ represents an organic radical having a valence of $2x+z$,
$R_2$ represents a divalent organic radical,
X represents a functional group,
$x$ represents an integer from 1 to 3,
$n$ represents 0 or an integer from 1 to 1000, and
$z$ represents 0 or an integer from 1 to 3.

Imidocarboxylic acids corresponding, for example, to the following general formula:

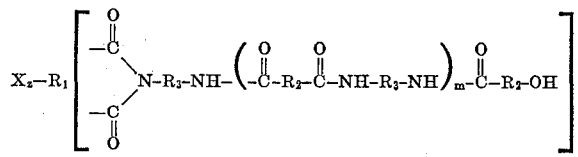

can be obtained from polyamides of the polyhexamethylene adipic amide type. In the above formula:

$R_1$, $R_2$, X, $x$ and $z$ are as defined above,
$R_3$ has the same meaning as $R_2$, and
$m$ represents 0 or an integer from 1 to 1000.

It is possible by virtue of the process according to the invention to obtain imidocarboxylic acids in the absence of any troublesome condensation products, such as water for example, which leads to dissociation of the primary product and to the formation of secondary products.

It is also possible to degrade high molecular weight polyamides into oligomeric polyamides which still contain reactive groups and which can be further reacted through these groups.

Any known polyamides may be used as linear polyamides in the process according to the invention, including, for example, those corresponding to the general formulae:

and

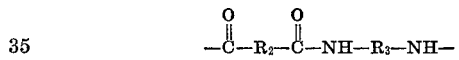

in which $R_2$ and $R_3$ represent optionally substituted divalent aliphatic, cycloaliphatic, aromatic, or mixed aliphatic, aromatic, or mixed aliphatic-aromatic radicals, optionally with hetero atoms or groups.

Instead of the linear polyamides, it is also possible to use oligomeric cyclic polyamides or those whose terminal groups are further reacted, for example acylated, or exist as esters or as amides.

$R_2$ and $R_3$ are preferably derived from methane, propane, hexane, dodecane, ethylene, cyclohexane, benzene, toluene, o-, m- or p-xylene, naphthalene, diphenyl, diphenylmethane, diphenyl sulphone, diphenyl ether or ethylene glycol bisphenyl carboxylic acid ester. They can be substituted, either once or several times, by, for example, alkyl, aryl, halogen, nitro, mercapto, amino, carboxy, carboxyalkyl, carboxyaryl, carboxyamido or cyano radicals. It is preferred to use the polyamides of aminocaproic acid, of aminolauric acid, of adipic acid and hexamethylene diamine, or of 4,4'-diaminodiphenyl ether and isophthalic acid.

Suitable cyclic dicarboxylic acid anhydrides include compounds corresponding to the general formula:

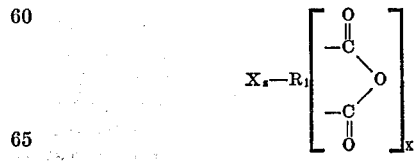

in which

R₁ represents an optionally substituted aliphatic, aromatic or aliphatic-aromatic radical having a valence of $2x+z$, X represents the radical:

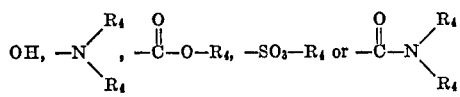

in which R₄ represents hydrogen or an aliphatic or aromatic radical, x represents an integer from 1 to 3, and z represents 0 or an integer from 1 to 3.

R₁ is preferably derived from ethane, n-, iso- or tert-butane, hexane, propene, butine, diethyl ether, dipropyl sulphide, cyclopentane, cyclohexane, benzene, naphthalene, diphenyl, diphenylmethane, diphenyl sulphone, diphenyl ether, toluene, o-, m- or p-xylene, tris-tolyl methane, ethylene glycol-bis-phenyl carboxylic acid ester, glycerol tris-phenyl carboxylic acid ester, polyesters, polyamides and polyimides. They can be substituted, either once or several times, for example by alkyl, halogen, nitro, alkoxy, aryloxy or cyano groups. In addition to hydrogen, R₄ preferably represents a radical derived from methane, propane, dodecane, propene, butine, cyclohexane, benzene, toluene, xylene or naphthalene.

The following are examples of suitable anhydrides:

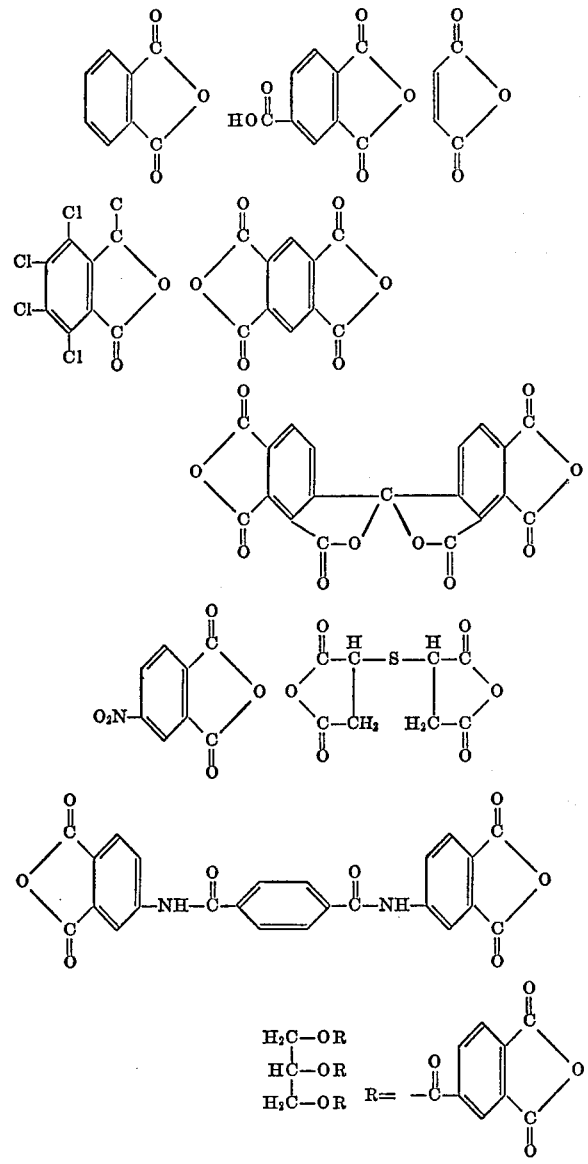

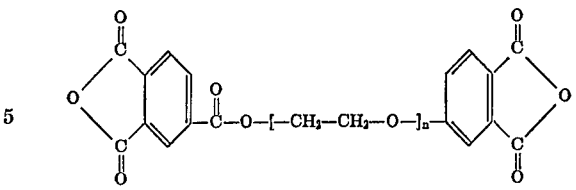

Instead of the carboxylic acid anhydrides, it is also possible to use compounds which, like o-dicarboxylic acids or their phenyl esters for example, can be converted into acid anhydrides during the reaction.

The process according to the invention is illustrated with reference to the following reaction scheme:

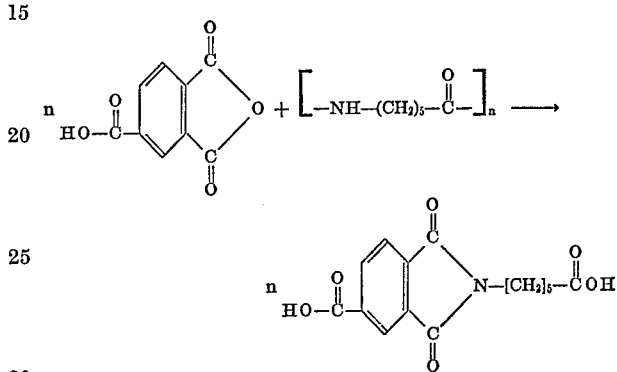

The reaction according to the invention can be carried out in solvents which, under the reaction conditions, do not react with the components or only form relatively loose addition compounds or compounds which react further. Suitable solvents are hydrocarbons, halohydrocarbons, phenols, esters, ketones, ethers, substituted amides, sulphoxides and sulphones, for example xylene, o-dichlorobenzene, phenol, cresol, acetophenone, glycol monomethyl ether acetate, diethylene glycol dimethylether, N-methyl pyrrolidone, dimethyl formamide, dimethyl sulphone and mixtures thereof.

To carry out the process according to the invention, the reaction components are kept at temperatures of from 20 to 450° C., and preferably from 100 to 250° C., for periods ranging from a few minutes to several hours, optionally in the presence of solvents. In some instances, it is of advantage to carry out the reaction in an inert protective gas such as nitrogen or argon.

The carboxylic acid anhydrides are used in equivalent quantities, or in excess when it is intended to obtain complete degradation of the polyamide. When oligomeric imide amides are produced, the stoichiometric ratios are derived from the required average molecular size of the degradation product.

The reaction according to the invention can be accelerated by suitable catalysts, for example by phosphoric acid, phosphorous acid, benzoic acid or zinc octoate and by compounds containing tertiary nitrogen atoms, such as triethylamine, triethylene diamine and imidazole.

The imidocarboxylic acids are used, for example, as components in the preparation of esters which are employed as plasticizers and as lacquer systems in electrical engineering, and some of which are distinguished by their outstanding thermal stability.

The following examples are to further illustrate the invention without limiting it.

EXAMPLE 1

192 g. (1 mol) of trimellitic acid anhydride and 113 g. (1 mol) of polycaprolactam with a relative solution viscosity $\eta_{rel}$ of 2.95 (measured on a 1% by weight solution in m-cresol at 25° C.) are stirred under nitrogen for 6 hours at 200 to 210° C. A hazy melt is formed which, after cooling, is recrystallized from dimethyl formamide/water following the addition of a little active carbon.

Trimellitic imidocaproic acid is obtained in the form of colorless polyhedra melting at 204 to 208° C.

$C_{15}H_{15}NO_6$ (305.3).—Calculated (percent): C, 59.0; H, 5.0; N, 4.6. Found (percent): C, 59.2, H, 5.0; N, 4.6.

EXAMPLE 2

21.8 g. (0.1 mol) of pyromellitic acid dianhydride and 56.6 g. (0.05 mol) of polycaprolactam ($\eta_{rel}$=2.95, measured as in Example 1) are fused and the resulting melt is stirred for 8 hours at 210 to 218° C. in the presence of nitrogen. A clear brown melt which solidifies on cooling is formed. The analytical data and infra-red spectrum which shows the bands characteristic of imides at 1715 and 1770 cm.$^{-1}$ corresponds to a pyromellitic imido-oligo-caproic acid amide with 5 units of caproic acid amide per mol of substituted pyromellitic acid.

Calculated: N, 8.9%. Found: N, 9.1%.

EXAMPLE 3

56.6 g. (0.25 mol) of hexamethylene adipic acid amide ($\eta_{rel}$=2.75, measured as in Example 1) and 96.0 g. (0.5 mol) of trimellitic acid anhydride are heated for 5 hours at 200 to 210° C. in the presence of nitrogen. The reaction mixture intially fuses, and then solidifies to form a greyish-white cake, which is recrystallized from dimethyl acetamide. 120 g. of bis-trimellitic imido hexane are obtained in the form of colorless polyhedra melting at 319 to 320° C.

$C_{24}H_{20}N_2O_8$ (464.4).—Calculated (percent): C, 62.1; H, 4.3; N, 6.0. Found (percent): C, 62.0; H, 4.2; N, 6.2.

EXAMPLE 4

19.1 g. (0.1 mol) of trimellitic acid anhydride are stirred for 8 hours at 195 to 215° C. with 56.6 g. (0.5 mol) of polycaprolactam ($\eta_{rel}$=2.95, measured as in Example 1). The reaction product (a substance which is solid and light grey in color after cooling) is a trimellitic imido-oligocaproic acid amide with an average of 5 units of caproic acid amide per mol of substituted trimellitic acid. Its infra-red spectrum shows the bands characteristic of imides at 1710 to 1770 cm.$^{-1}$.

Calculated: N, 9.3%. Found: N, 9.4%.

EXAMPLE 5

14.8 g. (0.1 mol) of phthalic acid anhydride are heated for 3 hours to 240° C. with 67.8 g. (0.3 mol) of hexamethylene adipic acid amide ($\eta_{rel}$=2.75, measured as in Example 1). The reaction mixture solidifies on cooling to form a light beige readily powdered mass.

IR:
  imide: 1712 and 1772 cm.$^{-1}$
  amide: 1537 cm.$^{-1}$

EXAMPLE 6

21.8 g. (0.1 mol) of pyromellitic acid dianhydride and 113 g. (0.5 mol) of hexamethylene adipic acid amide ($\eta_{rel}$=2.75, measured as in Example 1) are fused for 4 hours at 270° C. in the presence of nitrogen. The oligo-amide-imide is obtained in the form of a light brown substance.

IR:
  imide: 1713 and 1770 cm.$^{-1}$
  amide: 1635 cm.$^{-1}$

EXAMPLE 7

1.92 g. (0.01 mol) of trimellitic acid anhydride and 113 g. (1 mol) of polycaprolactam ($\eta_{rel}$=2.95, measured as in Example 1) are stirred for 2½ hours at 230 to 260° C. in the presence of nitrogen. A clear, pale yellow melt is formed, solidifying on cooling to form a readily hazing, solid mass.

IR:
  imide: 1715 cm.$^{-1}$, shoulder at 1770 cm.$^{-1}$
  amide: 1638 cm.$^{-1}$

EXAMPLE 8

84 g. (0.4 mol) of cyclopentane tetracarbocyclic acid dianhydride and 113 g. (1 mol) of polycaprolactam ($\eta_{rel}$=2.95, measured as in Example 1) are heated for 3 hours at 50° C. The reaction product is a dark-colored resin-like substance.

IR:
  imide: 1770 cm.$^{-1}$; imide and carboxylic acid band at 1700 cm.$^{-1}$
  amide: 1637 cm.$^{-1}$

EXAMPLE 9

50 g. (0.5 mol) of succinic acid anhydride and 169.5 g. (1.5 mols) of polycaprolactam ($\eta_{rel}$=2.95, measured as in Example 1) are reacted for 3.5 hours at 240° C. The succinimido-oligo-caproic acid amide is formed as a brown resin-like substance.

IR:
  imide: 1768 cm.$^{-1}$; imide and carboxylic acid: 1690–1720 cm.$^{-1}$
  amide: 1635 cm.$^{-1}$

EXAMPLE 10

21.0 g. (0.1 mol) of cyclopentane carboxylic acid dianhydride and 135.6 g. (0.6 mol) of hexamethylene adipic acid amide ($\eta_{rel}$=2.75, measured as in Example 1) are stirred for 4 hours in a stream of nitrogen, the temperature increasing from 230 to 280° C. The amide imide is obtained in the form of a solid brown substance.

IR:
  imide: 1708 cm.$^{-1}$; shoulder at 1770 cm.$^{-1}$
  amide: 1638 cm.$^{-1}$

EXAMPLE 11

74 g. (0.5 mol) of phthalic acid anhydride and 56.6 g. (0.5 mol) of polycaprolactam ($\eta_{rel}$=2.95, measured as in Example 1) are heated to 270° C. and kept at this temperature for 3 hours. The reaction product, 125 g. of phthalimido caproic acid melting at 95 to 96° C., is recrystallized from acetonitrile. Colorless polyhedra melting at 104 to 107° C. are obtained.

$C_{14}H_{15}NO_4$ (261.3).—Calculated (percent): C, 64.4; H, 5.8; N, 5.4. Found (percent): C, 64.7; H, 5.5; N, 5.5.

EXAMPLE 12

14.8 g. (0.1 mol) of phthalic acid anhydride and 113 g. (1 mol) of polycaprolactam ($\eta_{rel}$=2.95, measured as in Example 1) are heated for 1 hour at 230° C. and for 3 hours at 260° C. in a stream of nitrogen. The phthalimido oligo caproic acid amide solidifies on cooling to form a light grey substance.

IR:
  imide: 1712 and 1774 cm.$^{-1}$
  amide: 1640 cm.$^{-1}$

What we claim is:

1. The process for the production of imidocarboxylic acids which comprises reacting the polyamide containing as recurring structural unit the member of the group consisting of

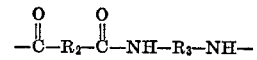

and

wherein $R_2$ and $R_3$ are independently selected from the group consisting of methylene, propylene, hexylene, dodecylene, ethenylene, cyclohexylene, phenylene, tolylene, o-, m-, or p-xylylene, naphthylene, diphenylene, diphenylene-methane, diphenylenesulphone, diphenylene ether or ethylene glycol-bis-phenylene carboxylic acid ester, with the cyclic dicarboxylic anhydride having the formula

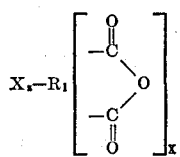

in which $R_1$ is selected from the group consisting of ethane, n-, iso- or tert.-butane, hexane, propane, butene, diethylether, dipropyl sulphide, cyclopentane, cyclohexane, benzene, naphthalene, diphenyl, diphenylmethane, diphenylsulphone, diphenyl ether, toluene, o-, m-, or p-xylene, tris-tolylmethane, ethylene glycol-bis-phenyl carboxylic acid ester or glycerol tris phenyl carboxylic acid ester, having the valency of $2x+z$ and X represents

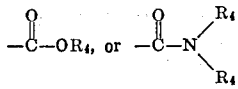

in which $R_4$ is selected from the group consisting of hydrogen methyl, propyl, dodecyl, propenyl, butenyl, cyclohexyl, phenyl, tolyl, xylyl or naphthyl and $x$ represents 1 or 2 and $z$ represents 0 or 1 at the temperature of from 20 to 240° C.

2. A process as claimed in claim 1, wherein the temperature is from 100 to 250° C.

3. A process as claimed in claim 1, wherein the reaction is carried out in the presence of an inert solvent.

4. A process as claimed in claim 1, wherein reaction is carried out in the presence of a catalyst.

5. A process as claimed in claim 4, wherein the catalyst is selected from the group consisting of phosphoric acid, phosphorous acid, benzoic acid, zinc octoate, triethylamine, triethylene diamine and imidazole.

6. A process as claimed in claim 1, wherein the anhydride is formed in situ from an o-dicarboxylic acid or a phenyl ester thereof.

7. A process as claimed in claim 1, wherein the cyclic dicarboxylic acid anhydride is trimellitic acid anhydride or pyromellitic acid anhydride.

8. A process as claimed in claim 3, wherein the solvent is selected from the group consisting of xylene, o-dichlorobenzene, phenol, cresol, acetophenone, glycol monomethyl ether acetate, diethylene glycol dimethyl ether, N-methyl pyrrolidone, dimethyl formamide, dimethyl sulphone, and mixtures thereof.

9. A process as claimed in claim 1 wherein the polyamide is selected from the group consisting of poly (caproic acid amide) poly (caprolactam), poly (lauric acid amide), poly (hexamethylene adipic acid amide) and poly (4,4' diphenylether isophthalic acid amide).

10. A process as claimed in claim 1 wherein the polyamide is polycaprolactam and the acid is trimellitic acid anhydride.

References Cited
UNITED STATES PATENTS
3,238,181   3/1966   Anderson _____ 260—65

JOSEPH A. NARCAVAGE, Primary Examiner

U.S. Cl. X.R.

260—326 A, 78